(12) United States Patent
Watkins et al.

(10) Patent No.: US 7,781,366 B2
(45) Date of Patent: Aug. 24, 2010

(54) SOL-GEL BASED OXIDATION CATALYST AND COATING SYSTEM USING SAME

(75) Inventors: Anthony N. Watkins, Hampton, VA (US); Bradley D. Leighty, Gloucester, VA (US); Donald M. Oglesby, Virginia Beach, VA (US); JoAnne L. Patry, Dulles, VA (US); Jacqueline L. Schryer, Hampton, VA (US)

(73) Assignee: The United States of America as represented by the United States National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 12/369,932

(22) Filed: Feb. 12, 2009

(65) Prior Publication Data

US 2009/0163357 A1    Jun. 25, 2009

(51) Int. Cl.
*B01J 23/00* (2006.01)
*B01J 21/00* (2006.01)
*B01J 20/00* (2006.01)
*B01J 29/00* (2006.01)

(52) U.S. Cl. .............. 502/327; 502/262; 502/304; 502/332; 502/334; 502/339; 502/349; 502/352; 502/355; 502/415; 502/439

(58) Field of Classification Search .......... 502/104, 502/233, 242, 262, 300, 304, 326, 327, 334, 502/339, 349, 352, 355, 415, 439
See application file for complete search history.

(56) References Cited

U.S. PATENT DOCUMENTS

| | | | | |
|---|---|---|---|---|
| 2,200,522 A | * | 5/1940 | Streicher | 502/262 |
| 3,284,369 A | * | 11/1966 | Bergna et al. | 502/240 |
| 3,580,970 A | * | 5/1971 | Swift | 568/799 |
| 3,657,153 A | * | 4/1972 | Bucur et al. | 502/262 |
| 3,840,477 A | * | 10/1974 | Braithwaite et al. | 502/241 |
| 3,878,131 A | | 4/1975 | Hayes | |
| 3,923,692 A | * | 12/1975 | Braithwaite et al. | 502/238 |
| 3,957,688 A | * | 5/1976 | Farha et al. | 502/330 |
| 4,169,815 A | * | 10/1979 | Drehman | 502/329 |
| 4,192,907 A | * | 3/1980 | Jalan et al. | 429/40 |
| 4,233,183 A | * | 11/1980 | Inaba et al. | 502/202 |
| 4,533,653 A | * | 8/1985 | Ishibe et al. | 502/242 |
| 5,118,653 A | * | 6/1992 | Barri et al. | 502/242 |
| 5,143,886 A | * | 9/1992 | Iezzi et al. | 502/242 |
| 5,208,200 A | * | 5/1993 | Soled et al. | 502/241 |
| 5,254,518 A | * | 10/1993 | Soled et al. | 502/241 |
| 5,275,995 A | * | 1/1994 | Bellussi et al. | 502/207 |
| 5,854,169 A | * | 12/1998 | Heller et al. | 502/242 |
| 6,093,676 A | * | 7/2000 | Heller et al. | 502/242 |
| 6,177,381 B1 | | 1/2001 | Jensen et al. | |
| 6,228,480 B1 | * | 5/2001 | Kimura et al. | 428/328 |
| 6,342,191 B1 | * | 1/2002 | Kepner et al. | 423/210 |
| 6,391,808 B1 | * | 5/2002 | Stiegman | 501/12 |
| 6,696,388 B2 | * | 2/2004 | Kourtakis et al. | 502/320 |
| 6,852,443 B1 | * | 2/2005 | Ohlsen | 429/44 |
| 6,919,365 B2 | * | 7/2005 | Sakai et al. | 514/389 |
| 7,138,358 B2 | * | 11/2006 | Huang et al. | 502/326 |
| 7,186,669 B2 | * | 3/2007 | Gole et al. | 502/242 |
| 7,198,864 B2 | * | 4/2007 | Ohlsen | 429/44 |
| 7,294,604 B2 | * | 11/2007 | Dath et al. | 502/250 |
| 7,345,214 B2 | * | 3/2008 | Xu et al. | 585/752 |
| 2001/0036433 A1 | * | 11/2001 | Euzen et al. | 423/245.3 |
| 2002/0077514 A1 | * | 6/2002 | Rossi et al. | 570/226 |
| 2005/0079115 A1 | | 4/2005 | Jordan et al. | |
| 2005/0170142 A1 | | 8/2005 | Remy | |

* cited by examiner

*Primary Examiner*—Cam N Nguyen
(74) *Attorney, Agent, or Firm*—Helen M. Galus

(57) ABSTRACT

An oxidation catalyst system is formed by particles of an oxidation catalyst dispersed in a porous sol-gel binder. The oxidation catalyst system can be applied by brush or spray painting while the sol-gel binder is in its sol state.

20 Claims, No Drawings

SOL-GEL BASED OXIDATION CATALYST AND COATING SYSTEM USING SAME

ORIGIN OF THE INVENTION

The invention was made in part by employees of the United States Government and may be manufactured and used by or for the Government of the United States of America for governmental purposes without the payment of any royalties thereon or therefor.

CROSS-REFERENCE TO RELATED PATENT APPLICATION

This patent application was co-pending with one related patent application entitled "Sol-Gel Based Oxidation Catalyst and Coating System Using Same," (NASA Case No. LAR-17154-1), application Ser. No. 11/421,924 filed June 2, by the same inventors as this patent application, which issued on Feb. 2, 2010 as U.S. Pat. No. 7,655,595 B2.

BACKGROUND OF THE INVENTION

1. Field of the Invention

This invention relates to oxidation catalyst systems. More specifically, the invention is an oxidation catalyst system that includes a sol-gel binder that allows the system to be easily coated onto a substrate.

2. Description of the Related Art

Oxidation involves the adding of an oxygen molecule or an electron to an existing molecule or compound. This process can occur naturally or can be induced. For example, a low temperature oxidation catalyst (LTOC) is required in space-based carbon dioxide ($CO_2$) lasers where carbon monoxide (CO) produced during the lasing cycle must be converted back to $CO_2$. Similar "CO-to-$CO_2$" LTOCs can be used for a wide variety of other applications such as smoke filter masks, three-way automotive catalyst converters, and cabin-air filtration systems. Other applications of LTOCs not necessarily related to oxidation of "CO-to-$CO_2$" include formaldehyde remediation systems used in industrial smoke stacks and catalytic-based sensors.

In each of these applications, preparation of the LTOC in a usable form is problematic. Typically, the LTOC must be applied to a substrate with the LTOC/substrate then being heated to adhere/bond the LTOC to the substrate. The substrates (e.g., silica gel in many mask and sensor applications, honeycomb ceramic bricks for automotive catalytic converter applications) are first coated using standard solution-based coating techniques such as slurry casting or dip-coating. These coating methods require excess amounts of the catalyst precursors to ensure adequate substrate coverage. This leads to an increase in material cost as well as causing waste handling concerns as the excess materials must be properly stored/disposed. Further, these substrate/LTOC "systems" generally require high temperature heating (i.e., up to 550° C. for many systems) to complete the LTOC-to-substrate adhering/bonding process.

SUMMARY OF THE INVENTION

Accordingly, it is an object of the present invention to provide an oxidation catalyst system.

Another object of the present invention is to provide an oxidation catalyst system that can be easily applied to a substrate or surface.

Still another object of the present invention is to provide an oxidation catalyst system adapted for one-step application to a substrate or surface.

Other objects and advantages of the present invention will become more obvious hereinafter in the specification.

In accordance with the present invention, an oxidation catalyst system is formed by particles of an oxidation catalyst dispersed in a porous sol-gel binder. The oxidation catalyst system can then be applied in a one-step application process such as brush or spray painting while the sol-gel binder is in its solution (or "sol") state. If necessary, a thinning solution can be combined with the porous sol-gel binder in its sol state with the oxidation catalyst particles already dispersed therein.

DETAILED DESCRIPTION OF THE INVENTION

The present invention is an oxidation catalyst system that lends itself to one-step application to a substrate or surface, the choice of which is not a limitation of the present invention. By way of illustrative example, the system described herein can be used in the oxidation of CO back to $CO_2$. However, it will be readily understood by one of ordinary skill in the art that the novel aspects of the present invention can be extended to a wide variety of oxidation (and oxidation/reduction) processes.

In accordance with the present invention, an oxidation catalyst system is created when particles of an oxidation catalyst are dispersed in a sol-gel binder. In the illustrative example, the oxidation catalyst is platinum-coated tin oxide. More specifically, particles of platinum-coated tin oxide are fabricated in a size range that is comparable to the size of pigments used in conventional paint products that can be brushed or sprayed onto a substrate or surface. Accordingly, in this example, the particles of platinum-coated tin oxide (or other suitable catalyst material) have diameters on the order of approximately 10 microns or less.

As would be understood in the art of such particle fabrication, a tin oxide dust is first made by mixing tin metal and nitric acid. One method for coating the tin oxide with platinum is described in U.S. Pat. No. 4,912,082, the contents of which are hereby incorporated by reference. Briefly, the tin oxide dust is mixed with a solution containing a platinum precursor, such as tetraamine platinum (II) hydroxide [Pt($NH_3$)$_4$(OH)$_2$] dissolved in water, which coats the tin oxide particles. The platinum-coated tin oxide is then heated/sintered, resulting in a conversion of the platinum precursor on the tin oxide to platinum metal. As would be understood in the art of such catalyst formulation, other established methods could also be used. If agglomeration of the platinum-coated tin oxide particles occurs during this heating step, the material is simply re-ground to create small particles suitable for dispersion. Depending on the particular oxidation application, the weight percent of platinum in the platinum-coated tin oxide is typically in the range of 3-20% platinum.

The sol-gel binder in which the oxidation catalyst particles are mixed can be made from any of a variety of precursors that, when processed, form a porous sol-gel network. For example, suitable sol-gel precursors include silica, alumina, zirconia, ceria, vanadia, metal oxides, and mixtures of these precursors. In the illustrative example, an alumina sol-gel binder was prepared for use with the platinum-coated tin oxide oxidation catalyst particles. A detailed description of sol-gel preparation is provided by X. J. Wang et al. in "Phase Trans Formation of $Er^{3+}$-doped $Al_2O_3$ Powders Prepared by the Sol-Gel Method," J. Mater. Res., Vol. 18, No. 10, 2003, pp. 2401-2405, the contents of which are hereby incorporated by reference. Briefly, an aqueous solution of aluminum isopropoxide was refluxed at 90° C. under vigorous stirring for two hours. After heating, a small amount of nitric acid was added to catalyze the hydrolysis of the alumina and refluxed for an additional 16 hours resulting in the formation of a clear sol.

The above-described platinum-coated tin oxide particles were then mixed with the above-described clear sol. The sizing of the particles as described above provided for their dispersion in the sol-gel binder. In testing various examples of this exemplary formulation, it was found that effective "CO-to-$CO_2$" oxidation resulted when there was approximately 10-20% by weight of the platinum-coated tin oxide particles in the sol-gel mixture. When this mixture turns to a gel, an embodiment of the present invention's oxidation catalyst system is formed.

Prior to gel formation, the mixture of the oxidation catalyst particles in the porous sol-gel binder can be applied in one step by brushing or spraying. If the mixture is too viscous for conventional paint applications or if the mixture gels too quickly, the mixture may need to be "thinned". That is, the particle-binder mixture (while the binder is in its sol state) can be thinned as necessary for ease of application and/or to retard the "sol-to-gel", conversion of the sol-gel binder. Such thinning is a process well-known in the paint formulation art with the thinner being selected to prevent unwanted reactions with the sol-gel binder and the oxidation catalyst particles. For the illustrated example of alumina sol-gel and platinum-coated tin oxide particles, a suitable thinner is 2-butanone or methyl ethyl ketone (MEK) as it is also known.

Once the above-described oxidation catalyst system in its sol state is coated (e.g., sprayed, brushed, etc.) on a substrate or surface, some drying time is required to allow any excess water to be removed. The coating can also be exposed to low temperature heat (e.g., on the order of 100-110° C. for the illustrated example) to speed up the drying process.

The advantages of the present invention are numerous. The oxidation catalyst system described herein can be applied in one step while the system's binder is in its sol state. Such application involves conventional painting techniques. The system is therefore readily applied to cloth-based filters, flexible substrates, thin screens, etc., using just the amount of material needed to coat the substrate. The sol-gel binder provides for (i) mechanical stabilization of the oxidation catalyst particles within the porous structure of the sol-gel binder, (ii) adhesion of the "system" to a substrate, and (iii) catalytic conversion of CO to $CO_2$ and water owing to the porous nature of the sol-gel binder. Tests of the present invention yielded effective catalytic reactions.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

The invention claimed is:

1. A method for making an oxidation catalyst system comprising the steps of:
   providing a sol-gel binder;
   providing particles of an oxidation catalyst comprising platinum-coated tin oxide;
   dispersing the particles in the sol-gel binder.

2. The method of claim 1 wherein said step of dispersing the particles in the sol-gel binder forms a mixture adapted for one-step application as a surface coating.

3. The method of claim 2, wherein said sol-gel binder is based on at least one sol-gel precursor selected from the group consisting of silica, alumina, zirconia, ceria, vanadia, metal oxides, and mixtures thereof.

4. The method of claim 1 wherein said step of providing particles of an oxidation catalyst comprises the step of:
   fabricating oxidation catalyst particles in a size range suitable for brushing or spraying onto a surface.

5. The method of claim 1 wherein the particle of platinum-coated tin oxide comprise a weight percent of platinum in the range of about 3-20%.

6. A method for making an oxidation catalyst comprising the steps of:
   providing a sol-gel binder;
   providing particles of an oxidation catalyst;
   dispersing the particles in the sol-gel binder;
   providing a thinner; and
   combining the thinner with the sol-gel binder with said particles dispersed therein to form a mixture adapted for one-step application as a surface coating.

7. The method of claim 6 wherein said step of providing particles of an oxidation catalyst comprises the step of:
   fabricating oxidation catalyst particles in a size range suitable for brushing or spraying onto a surface.

8. The method of claim 7 wherein the size range is approximately 10 microns or less.

9. The method of claim 6, wherein said sol-gel binder is based on at least one sol-gel precursor selected from the group consisting of silica, alumina, zirconia, ceria, vanadia, metal oxides, and mixtures thereof.

10. A method for making an oxidation catalyst comprising the steps of:
    providing a sol-gel binder;
    providing particles of an oxidation catalyst; and
    dispersing the particles in the sol-gel binder;
    wherein said step of providing particles of an oxidation catalyst comprises the step of fabricating oxidation catalyst particles in a size range suitable for brushing or spraying onto a surface, wherein the size range is approximately 10 microns or less.

11. The method of claim 10 wherein the oxidation catalyst comprises platinum-coated tin oxide.

12. The method of claim 11 wherein the particles of platinum-coated tin oxide comprise a weight percent of platinum in the range of about 3-20%.

13. The method of claim 10 wherein said step of dispersing the particles in the sol-gel binder forms a mixture adapted for one-step application as a surface coating.

14. The method of claim 10, wherein said sol-gel binder is based on at least one sol-gel precursor selected from the group consisting of silica, alumina, zirconia, ceria, vanadia, metal oxides, and mixtures thereof.

15. The method of claim 10 further comprising the step of:
    providing a thinner; and
    combining the thinner with the sol-gel binder with said particles dispersed therein to form a mixture adapted for one-step application as a surface coating.

16. A method for making an oxidation catalyst system comprising the steps of:
    providing a sol-gel binder;
    providing particles of an oxidation catalyst; and
    dispersing the particles in the sol-gel binder;
    wherein said particles comprise approximately 10-20% by weight of the catalyst system.

17. The method of claim 16 wherein said step of dispersing the particles in the sol-gel binder forms a mixture adapted for one-step application as a surface coating.

18. The method of claim 16, wherein said sol-gel binder is based on at least one sol-gel precursor selected from the group consisting of silica, alumina, zirconia, ceria, vanadia, metal oxides, and mixtures thereof

19. The method of claim 16 wherein said step of providing particles of an oxidation catalyst comprises the step of fabricating oxidation catalyst particles in a size range suitable for brushing or spraying onto a surface.

20. The method of claim 19 wherein the size range is approximately 10 microns or less.

* * * * *